United States Patent Office 3,300,430
Patented Jan. 24, 1967

3,300,430
CHROMIC ACETATE-2,4,6-TRIMETHYLPHENOL REACTION PRODUCT AS WATERPROOFING ADDITIVE FOR VINYL ACETATE POLYMERS
Walter B. Armour, Plainfield, N.J., and Richard A. Fass, Brooklyn, N.Y., assignors to National Starch and Chemical Corporation, New York, N.Y., a corporation of Delaware
No Drawing. Filed May 15, 1964, Ser. No. 367,896
8 Claims. (Cl. 260—29.6)

This invention relates to the preparation of a novel composition of matter which is especially useful as a waterproofing additive for adhesives based upon emulsions of vinyl polymers.

It is the prime object of this invention to provide new compositions of matter which may be admixed with aqueous emulsions of vinyl polymers in order to impart improved water resistance and strength to the films and coatings derived therefrom. A further object of this invention involves the preparation of high strength, water resistant adhesive formulations comprising the novel waterproofing additive of this invention in combination with aqueous emulsions of vinyl polymers.

As is well known in the art, modern adhesives are prepared from a wide variety of synthetic polymers, or resins, many of which are often blended with one another or with extraneous reagents so as to provide adhesive systems displaying specific properties desired by the practitioner. Most adhesives are ordinarily classified as being either thermoplastic or thermosetting. Thus, thermosetting adhesives are formulated with resins which, by means of a chemical cross-linking reaction, solidify or set on heating and which cannot, thereafter, be re-softened on further heating. Thermoplastic adhesives, on the other hand, are made with resins which may be softened on heating and which then regain their original properties upon cooling.

Polyvinyl acetate and various copolymers of vinyl acetate are often employed in the preparation of thermoplastic adhesive compositions. Such adhesives have proven useful for the bonding of porous substrates, such as wood, paper and leather, intended for use in applications which do not require extensive water resistance. However, when attempts are made to use these adhesives for exterior applications, it is found that the bonds which are obtained are usually lacking in water resistance. This property is, of course, required in adhesives to be utilized in the bonding of substrates which are to be exposed to the excessive moisture and varying temperature conditions encountered during outdoor exposure.

In an attempt to improve the strength and water resistance of the bonds which are obtained with adhesives derived from the polymers of vinyl acetate, they have been combined with various thermosetting materials such as the phenol-formaldehyde resins, etc. Although the water resistance of these combinations is superior to that of ordinary polyvinyl acetate adhesives, they are still not entirely adequate for use in exterior applications. Thus, these combinations must be cured at rather high temperatures, in the range of about 300° F., so as to be able to achieve even this limited improvement in water resistance.

In addition, such systems require the addition of an acid or an aldehyde catalyst immediately prior to their use. The use of such catalysts therefore precludes the preparation of one-package products inasmuch as the resulting mixtures of resin emulsions and catalysts must be used almost immediately or they will gel. Thus, the need remains for a suitable additive which can be formulated with aqueous emulsions of vinyl acetate homo- and copolymers so as to provide stable, one-package systems capable of yielding strong, water resistant adhesive bonds.

The present invention provides novel waterproofing additives for use with aqueous emulsions of vinyl acetate homo- and copolymers. This material can be added to the latter emulsions in essentially unlimited quantities since its pH is in the same range with these emulsions and the physical compatibility of the resulting mixtures has been found to be excellent. Moreover, although the resulting mixtures yield thermosetting films and coatings, these formulations are nonetheless stable at room temperature since they require temperatures in the order of about 250° F. in order to initiate their cure.

The novel waterproofing additive of this invention comprises the reaction product of chromic acetate, i.e.

$$Cr(CH_3COO)_3$$

and 2,4,6-trimethylol phenol, i. e.

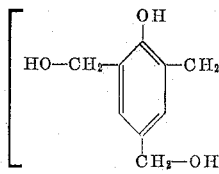

For purposes of brevity, 2,4,6-trimethylol phenol will be, hereinafter, referred to as TMP.

On the basis of the known reactivity of the methylol groups of TMP and the known tendency of chromium to form stable complexes, it is believed that the novel chromic acetate-TMP reaction products of this invention possess a structure corresponding to the following formula:

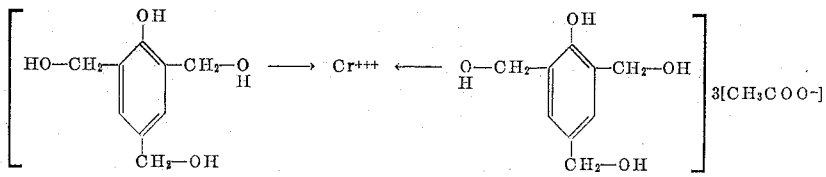

In the latter formula, the bonds between the chromium atom and the oxygen atoms of the methylol groups of the TMP are the so-called coordinate bonds which are of the type frequently encountered in chromium compounds.

The preparation of this novel reaction product is quite simple, involving the addition of the TMP, in the form of the aqueous solution in which it is ordinarily supplied, to a previously prepared aqueous solution of the chromic acetate. This mixture of the two solutions is then stirred, for about 5 to 10 minutes, at room temperature, in order to complete the reaction. In some preparations, a small amount of excess chromic acetate may appear in the form of a sediment which may be readily removed by decantation.

Since the resulting reaction product will ordinarily be utilized in the form of an aqueous solution, it is not therefore necessary to separate it from the aqueous medium in which it has been prepared. If the solution containing the reaction product is to be stored for a prolonged period, it is suggested that it be frozen since the chromic acetate-TMP reaction product is a rather labile material. However, such precautions need not be taken with aqueous emulsions of vinyl acetate homo- or copolymers which have been blended with solutions of this reaction product as such formulations may be maintained, indefinitely, under room temperature conditions.

As noted above, the TMP is usually employed, in the process of this invention, in the form of an aqueous solution. As supplied commercially, such solutions have a concentration of about 70%, by weight, of TMP. Chromic acetate is ordinarily available as a hydrate having the formula $Cr_2(CH_3COO)_6 \cdot 2H_2O$. With respect to proportions, it has been found that one may use from about 0.38 to 0.64 part of chromic acetate per 1.0 part of TMP in preparing these novel reaction products. The latter proportions are presented in terms of the weight of solid reactants.

As ordinarily prepared by means of the above described procedure, the aqueous solutions of our novel chromic acetate-TMP reaction products will contain the latter reaction product in a concentration of about 50%, by weight. These solutions, which are dark green in color, have a viscosity, at 25° C., of about 15–25 centistokes, a specific gravity of about 1.15–1.20, a pH in the range of 4.5–5.5 and are dispersible in water in all proportions.

In using the chromic acetate-TMP reaction products of this invention as waterproofing additives for adhesives based on aqueous emulsions of homo- or copolymers of vinyl acetate, the aqueous solutions of these reaction products need merely be admixed with the desired resin emulsion. For most purposes, excellent results will be obtained with the addition of about 3 to 50 parts of the reaction product, on a solids basis, to 100 parts of resin emulsion solids with optimum results being attained with about 17 parts of reaction product solids per 100 parts of resin solids. The resulting formulations are stable, one-package products which can be stored for prolonged periods prior to their ultimate use without the danger of any premature gellation, or other deterioration occurring. The formulations may be used in the bonding, coating, lamination, or saturation of many types of porous substrates such as wood, tempered hardboard, textiles, leather, paperboard, paper, cement, honeycomb cores made of metal or plastics, various plastic films such as polyvinyl chloride or polyethylene, as well as for the manufacture of such products of plywood and wood particle board.

In order to effect the cure of the above described adhesive formulations, i.e. to thermoset the adhesive bonds derived therefrom, it is necessary that the substrates which have been bonded or coated therewith be heated to a temperature in the range of about 250° F. for a period of about 5 to 10 minutes. Pressure, in the order of about 50 pounds per square inch may also be applied to the laminates or other structures being bonded with these adhesives and under such conditions pressure and heat will ordinarily be applied simultaneously. As noted earlier, it is not necessary to introduce any catalysts or other additives into these formulations immediately prior to their use.

In addition to the aqueous emulsions of the homopolymer of vinyl acetate, i.e. polyvinyl acetate, the chromic acetate-TMP reaction products of this invention may be blended with emulsions of copolymers of vinyl acetate with various comonomers such, for example, as the alkyl esters of acrylic and methacrylic acids; ethylenically unsaturated carboxylic acids; the monoalkyl esters and the derivatives of the monoalkyl esters of ethylenically unsaturated dicarboxylic acids; the glycidyl esters of acrylic and methacrylic acids; vinyl halides; vinylidene halides; vinyl esters of carboxylic acids; amides of acrylic and methacrylic acids; the methylol derivatives of the amides of acrylic and methacrylic acids; and, alkyl vinyl ethers.

Applicable copolymers may contain one or more of the latter comonomers or any other vinyl, i.e. ethylenically unsaturated, comonomer whose use is desired by the practioner. However, such copolymers should ordinarily contain at least about 50%, by weight, of vinyl acetate. In any event, the adhesive bonds developed with the adhesive formulations containing the novel chromic acetate-TMP reaction products of this invention are found to possess outstanding resistance to water which results in their exceptionally high strength when employed in applications requiring outdoor exposure and/or a high degree of water resistance.

As an alternative to the above described procedure for the preparation of the novel chromic acetate-TMP reaction products of this invention, it is also possible to prepare these reaction products by means of an in situ reaction. In this technique, the respective solutions of TMP and chromic acetate are introduced, as separate ingredients, into an aqueous emulsion of a vinyl acetate homo- or copolymer whereupon, with agitation, the desired reaction product is produced. It should, however, be noted that it is preferable to employ a previously prepared chromic acetate-TMP reaction product as a waterproofing additive for vinyl acetate polymer emulsions inasmuch as the films and coatings derived from the resulting formulations have been found to display a degree of water resistance which is somewhat superior to that which is attained with comparable polymer emulsions wherein the reaction product is produced by means of the in situ technique.

It is to be noted that although the novel reaction product of TMP with chromic acetate illustrates the product very well, comparable TMP reaction products may also be prepared using various water soluble chromic salts other than the acetate. Thus, one may utilize such chromic salts as the bromide, the chloride, the nitrate, the phosphate and the sulfate, etc. However, it has been found that optimum results, as waterproofing additives for adhesives based upon aqueous emulsions of vinyl acetate polymers, are obtained with the use of the chromic acetate reaction product.

The following examples will further illustrate the embodiment of this invention. In these examples, all parts given are by weight, unless otherwise noted.

*Example I.*—This example illustrates the preparation of the novel chromic acetate-TMP reaction product of this invention.

A solution of chromic acetate in water was prepared by introducing 169 parts of $Cr_2(CH_3COO)_6 \cdot 2H_2O$ into 300 parts of water and thereupon stirring the resulting mixture, at room temperature, for a period of 10 minutes. To the latter solution, there was added 329 parts of a 70%, by weight, aqueous solution of TMP and this mixture was then stirred for another 10 minutes, at room temperature, in order to complete the preparation of the desired reaction product. The resulting solution contained 50%, by weight, of the chromic acetate-TMP reaction product. The solution was dark green in color, its viscosity, at 25° C. was 20 centistokes, its specific gravity was 1.17, and its pH was 4.7. This solution was dispersible in water in all proportions.

*Example II.*—This example illustrates the use of the novel chromic acetate-TMP reaction products of this invention as waterproofing additives for adhesives based on aqueous emulsions of various vinyl acetate polymers.

Below are described a number of adhesive formulations, i.e. Nos. 2, 4 and 6, which were prepared by adding portions of the aqueous solution of the chromic acetate-TMP reaction product, as prepared by means of the procedure described in Example I hereinabove, to aqueous emulsions of the three different vinyl acetate polymers. Formulation No. 1 represents a control containing the identical polymer emulsion as utilized in Formulation No. 2 but which did not, in this case, contain any of the chromic acetate-TMP reaction product. Formulations Nos. 3 and 5 are comparable controls for Formulations Nos. 4 and 6, respectively. Formulation No. 7 represents still another control for Formulation No. 6 in that it contains the identical polymer emulsion as used in Formulation No. 6 but, rather than being admixed with a solution containing the chromic acetate-TMP reaction product, it was instead admixed with separate solutions of TMP and chromic acetate whereby the desired chromic acetate-TMP reaction product was produced by means of an in situ reaction. The following table describes the composition of each of these seven formulations.

Following the above described mitering operation, the test specimens were aged for 7 days at a temperature of 70–75° F. and at a relative humidity of 50%. A total of 5 test specimens made with each of the seven adhesive formulations were thereupon soaked in water, which was at a temperature of 72° F., for a period of 48 hours. While still wet, the tensile shear strength in p.s.i., i.e. pound per square inch, of the adhesive bonds of these test specimens was determined with an Instron Tensile Tester which was run at a rate of shear, or crosshead speed, of 0.2 inch per minute. Thus, those specimens whose adhesive bonds displayed superior water re-

|  | Formulation Nos. | | | | | | |
|---|---|---|---|---|---|---|---|
|  | 1 | 2 | 3 | 4 | 5 | 6 | 7 |
| An aqueous emulsion of a polyvinyl acetate homopolymer with a resin solids content of 50% by weight | 100 | 100 | | | | | |
| An aqueous emulsion of a 92:4 vinyl acetate:N-methylol acrylamide copolymer with a resin solids content of 50% by weight | | | 100 | 100 | | | |
| An aqueous emulsion of a 96.5:3.5 vinyl acetate: cyanoethyl half ester of maleic acid copolymer with a resin solids content of 50% by weight | | | | | 100 | 100 | 100 |
| An aqueous solution containing 50% by weight of the chromic acetate-TMP reaction product | | 17 | | 17 | | 17 | |
| An aqueous solution containing 70% by weight of TMP | | | | | | | 7 |
| An aqueous solution containing 32% by weight of $Cr_2(CH_3COO)_6 \cdot 2H_2O$ | | | | | | | 11.2 |

All of the above described formulations, including those containing the chromic acetate-TMP reaction product, were found to be extremely stable preparations as samples sistance could be readily recognized by their higher shear strengths. The following table presents the average results of these tests.

|  | Adhesive Formulation Nos. | | | | | | |
|---|---|---|---|---|---|---|---|
|  | 1 | 2 | 3 | 4 | 5 | 6 | 7 |
| Tensile Shear Strength in p.s.i. | 68 | 314 | 272 | 314 | 78 | 481 | 380 | were maintained for periods of up to 12 weeks without any evidence of gellation or other deterioration.

In order to evaluate the performance of these formulations, they were each tested by means of the following procedure wherein the respective formulations were applied in films having a wet thickness of 0.009 inch to one surface of a number of 1/16" x 7" x 7" yellow birch wood veneers. One minute subsequent to the application of the adhesive thereon, three of these veneers were mated so that there was adhesive applied to the inner side of one of the outer veneers and to one side of the inner veneer with the result that in each resulting 3 ply laminate, a dry side was always positioned against an adhesive coated side. The laminates were then maintained, without pressure, for a 10 minute period whereupon they were compressed for 15 minutes at a pressure of 100 pounds per square inch and at a temperature of 250° F. in order to effect the cure of the respective adhesives utilized in their preparation.

Following their removal from the hot press, the test specimens were cut into 1" x 5" pieces so that the face grain direction of each veneer was parallel to the long dimension of the specimen. The specimens were thereupon mitered so that a distance of 1⅞" from one end of the specimen, a cut ⅛" wide was made to a depth of ⅔ of the way through its center veneer. An identical cut was also made on the surface of the specimen opposite to that on which the first cut had been made and 1⅞" in from the end of the specimen opposite to that from which the first cut had been made.

The above data clearly serve to indicate the improved water resistance and resultant high tensile shear strength which was developed by those adhesive formulations, i.e. Nos. 2, 4 and 6, which had been blended with the novel chromic acetate-TMP reaction product of this invention. It may be noted that the above described test procedure conforms to the cold soak test described by Federal specification MMMA–125 for water resistant adhesives. The standards established for the latter test call for a minimum tensile shear strength of 140 pounds per square inch. Thus, in each case, it is seen that the use of these novel chromic acetate-TMP reaction products results in adhesive bonds whose tensile shear strength far exceeds the latter minimum standard.

A study of the results obtained with Formulation Nos. 6 and 7 indicates that although the preparation of the chromic acetate-TMP reaction product by means of the in situ technique involving the separate addition of solutions of chromic acetate and TMP to a vinyl acetate polymer emulsion, as in Formulation No. 7, results in improved water resistance, it is, nonetheless, somewhat less of an improvement than is obtained by the use of a previously prepared chromic acetate-TMP reaction product.

Summarizing, this invention is thus seen to provide novel chromic acetate-TMP reaction products which are especially suited for use as waterproofing additives for adhesives based on aqueous emulsions of vinyl polymers. Variations may be made in proportions, materials or procedures without departing from the scope of this invention as limited by the following claims.

What is claimed is:
1. The novel composition of matter corresponding to the formula:

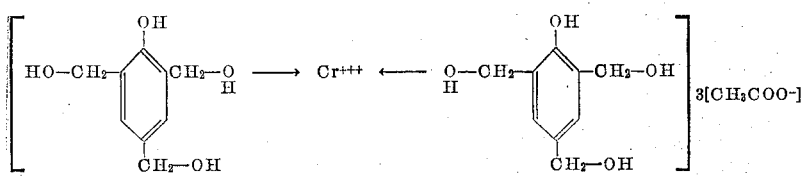

2. The method of preparing the reaction product of chromic acetate and 2,4,6-trimethylol phenol which comprises admixing, with agitation, of an aqueous solution of chromic acetate with an aqueous solution of 2,4,6-trimethylol phenol; the proportions of the latter reagents being in the range of from about 0.38 to 0.64 part by weight, of chromic acetate per 1.0 part, by weight, of 2,4,6-trimethylol phenol with said reaction product corresponding to the formula:

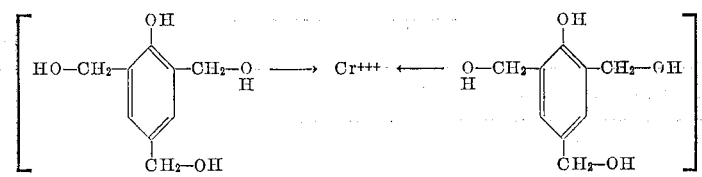

3. An adhesive composition capable of yielding adhesive bonds displaying improved water resistance, said composition comprising an aqueous emulsion of a vinyl acetate polymer having blended therewith, as a waterproofing additive, a reaction product of chromic acetate and 2,4,6-trimethylol phenol; the proportions of the latter reagents being in the range of from about 0.38 to 0.64 part by weight, of chrome acetate per 1.0 part by weight, of 2,4,6-trimethylol phenol with said reaction product corresponding to the formula:

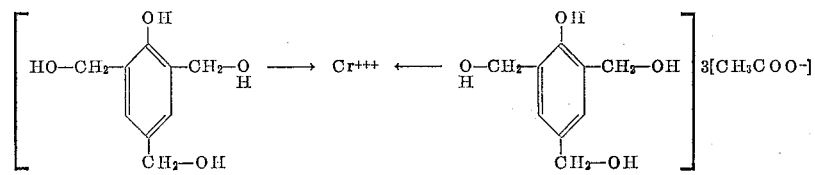

4. The adhesive composition of claim 3, wherein said vinyl acetate polymer is selected from the group consisting of the homopolymer of vinyl acetate and copolymers of vinyl acetate with at least one ethylenically unsaturated comonomer.

5. A waterproof film comprising the dried, consolidated residue obtained upon the removal of water from a wet film of an aqueous emulsion of a vinyl acetate polymer having admixed therewith, as a waterproofing additive, a previously prepared reaction product of chromic acetate and 2,4,6-trimethylol phenol; the proportions of the latter reagents being in the range of from about 0.38 to 0.64 part by weight, of chromic acetate per 1.0 part, by weight, of 2,4,6-trimethylol phenol with said reaction product corresponding to the formula:

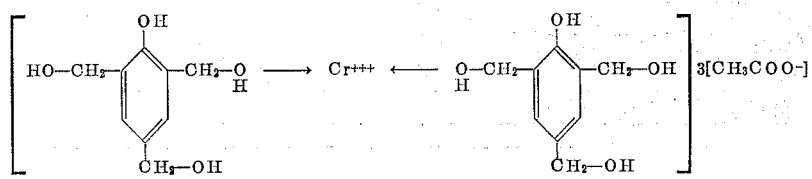

6. The film of claim 5, wherein said vinyl acetate polymer is selected from the group consisting of the homopolymer of vinyl acetate and copolymers of vinyl acetate with at least one ethylenically unsaturated comonomer.

7. The method of improving the water resistance of films derived from an aqueous emulsion of vinyl acetate polymers which comprises, adding to an emulsion of said polymer an aqueous solution of chromic acetate and an aqueous solution of 2,4,6-trimethylol phenol, thereby to induce formation, in situ, of the reaction product thereof; the proportions of the latter reagents being in the range of from about 0.38 to 0.64 part by weight, of chromic acetate per 1.0 part, by weight, of 2,4,6-trimethylol phenol with said reaction product corresponding to the formula:

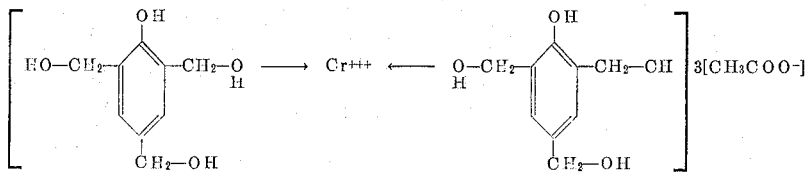

8. The method of claim 7, wherein said vinyl acetate polymer is selected from the group consisting of the homopolymer of vinyl acetate and copolymers of vinyl acetate with at least one ethylenically unsaturated comonomer.

References Cited by the Examiner
UNITED STATES PATENTS 2,595,953   5/1952   Kunze et al. _____ 260—29.6
2,958,605   11/1960  Leiner et al. _____ 260—621

SAMUEL H. BLECH, *Primary Examiner.*

MURRAY TILLMAN, *Examiner.*

J. ZIEGLER, *Assistant Examiner.*